United States Patent [19]

Stow et al.

[11] 3,762,946

[45] Oct. 2, 1973

[54] SMALL-PARTICLE-LOADED ELECTRICALLY CONDUCTIVE ADHESIVE TAPE

[75] Inventors: Robert H. Stow, White Bear; Gaylord L. Groff, North St. Paul, both of Minn.

[73] Assignee: Minnesota Mining and Manufacturing Company, St. Paul, Minn.

[22] Filed: Oct. 21, 1971

[21] Appl. No.: 191,370

[52] U.S. Cl. ............ 117/227, 117/201, 117/122 P, 117/122 PA, 117/122 H

[51] Int. Cl. ......................... B44d 1/18, A61i 15/06

[58] Field of Search ............... 117/227, 201, 122 P, 117/122 PA, 122 H

[56] References Cited

UNITED STATES PATENTS

| | | | |
|---|---|---|---|
| 3,497,383 | 2/1970 | Olyphant | 117/212 |
| 3,475,213 | 10/1969 | Stow | 117/227 |
| 2,982,934 | 5/1961 | Browne | 117/122 H |
| 2,808,352 | 10/1957 | Coleman | 117/122 PA |

*Primary Examiner*—Alfred L. Leavitt
*Assistant Examiner*—M. F. Esposito
*Attorney*—Alexander, Sell, Stedt & Delahunt

[57] ABSTRACT

Electrically conductive adhesive tapes in which the layer of adhesive is made conductive by the inclusion of small, complex metal particles having a low apparent density.

8 Claims, 1 Drawing Figure

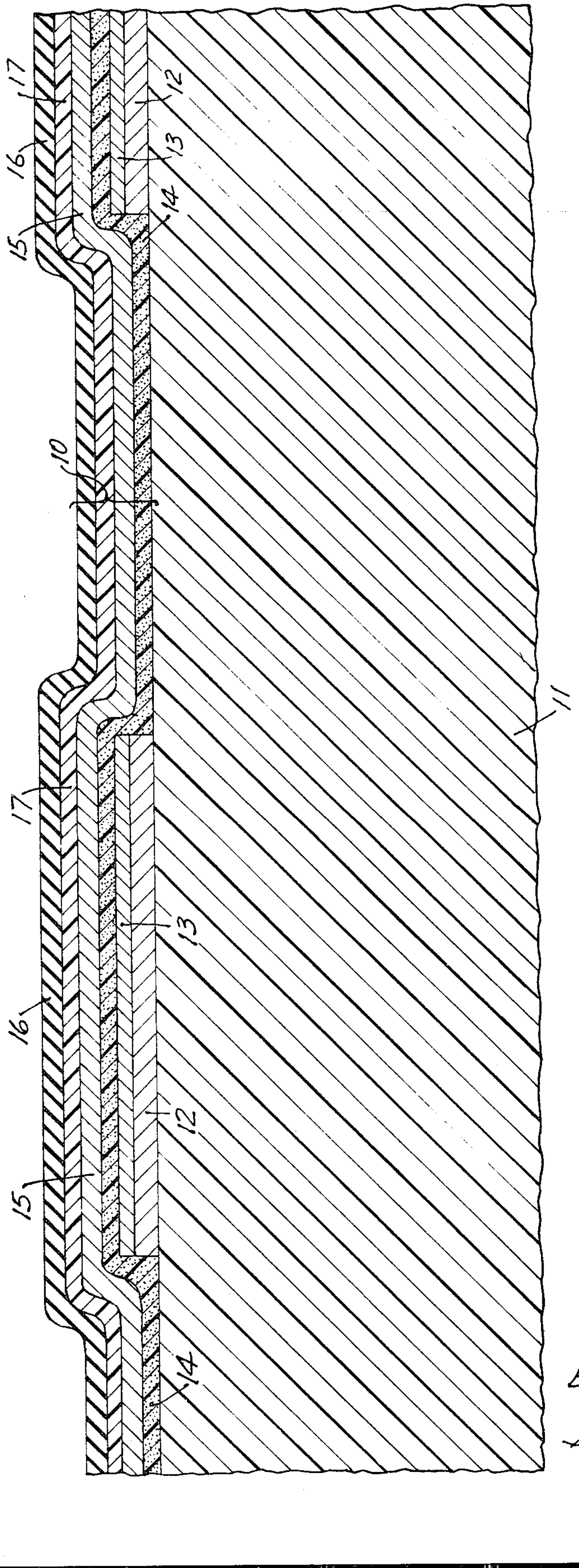
INVENTORS
ROBERT H. STOW
GAYLORD L. GROFF
BY Kinney, Alexander, Sell, Steldt & DeLa Hunt
ATTORNEYS

SMALL-PARTICLE-LOADED ELECTRICALLY CONDUCTIVE ADHESIVE TAPE

The background for the present invention includes such prior-art teachings as: Coleman et al, U.S. Pat. No. 2,808,352, where it was suggested that an electrically conductive adhesive tape be formed by dispersing finely divided silver in a pressure-sensitive adhesive and coating the adhesive on an electrically conductive backing; Stow, U.S. Pat. No. 3,475,213, which taught a conductive tape in which a layer of pressure-sensitive adhesive included a monolayer of large conductive particles, particles that were only slightly less thick than the pressure-sensitive-adhesive layer; and Olyphant et al, U.S. Pat. No. 3,497,383, which taught embossing an electrically conductive backing to have many closely spaced electrically conductive projections that extend almost through the layer of adhesive.

None of these prior-art teachings provided an adhesive tape that would make reliable adhesive and electrical connection to very small electrodes. To make such connections, the layer of adhesive needs to approach volume-conductivity—that is, conductivity throughout substantially the whole volume of adhesive, as opposed to conductivity on rather widely separated finite paths—and none of these prior approaches provided sufficiently reliable volume-conductivity. Since connection to small electrodes or contacts is important for many uses of conductive tapes—for example, it is essential if the tape is to be used as a "bus" conductor in processes for metal-plating certain printed circuit boards—the prior-art tapes have not fully exploited the potential for conductive tapes.

The present invention provides conductive adhesive tapes in which the layer of adhesive approaches volume-conductivity and reliably contacts small electrodes. Briefly, a conductive tape of the invention comprises a metal foil backing and a layer of an electrically conductive adhesive united to at least one side of the backing. The adhesive comprises a chemically compatible mixture of adhesive material and small metal particles of complex shape. The particles are so small and complex in shape that they have a low apparent density (the ratio of their weight to their dry bulk volume hereafter the dry bulk volume of a quantity of particles will be referred to as the "apparent volume" of the particles), generally less than about 10 percent of their true density. They are included in significant amount, generally providing a ratio of apparent volume of metal particles to volume of adhesive material of at least about 0.5 to 1.

A tape of the invention does not necessarily exhibit pressure-sensitive adhesion, and best results occur when the tape is applied to a substrate with heat and pressure. When applied in that manner to small electrodes, for example, to a set of 1/32-inch-wide line-shaped conductors on the surface of a circuit board, with the tape overlapping a ½-inch length of the conductors, a low-resistance electrical connection will be made to each of the electrodes.

DESCRIPTION OF THE DRAWING

The drawing is a greatly enlarged longitudinal section through an exemplary tape 10 of the invention applied to a printed circuit board 11 transversely across parallel electrodes 12. The electrodes are coated with a layer of solder 13 and are separated by a distance about equal to their width. After application, the tape conforms to the electrodes, with the layer 14 of electrically conductive particle-loaded adhesive pressed in adjacent the sides of the electrodes. The layer of adhesive is carried on a metal foil backing 15, which also carries an exterior organic polymeric electrically insulating film 16 united to the backing by means of a nonconductive adhesive 17. In one typical use, the tape is applied to a circuit board as illustrated, the layer of solder on portions of the electrodes not covered with tape is removed by a liquid treatment, and the uncovered electrodes then plated with gold.

DETAILED DESCRIPTION

The invention will be illustrated by the following examples.

EXAMPLE 1

An electrically conductive adhesive was prepared by mixing the following ingredients for 16 hours in a pebble mill:

| | Parts by Weight |
|---|---|
| 25-weight-percent-solids solution in ethyl acetate of a copolymer of isooctylacrylate (96 parts) and acrylamide (4 parts) | 140 |
| Carbonyl nickel powder (having an average particle size of 3 microns and an apparent desnity of 0.55 gram/cc; Type 255 from International Nickel Co. produced by the thermal decomposition of nickel tetracarbonyl) | 67.4 |
| Disalicylal propylene diamine (Copper Inhibitor 50 from DuPont) | 0.5 |
| 4,4-thiobis (6 tert butylmetacresol) (Santonox R from Monsanto) | 1.5 |

This adhesive was knife-coated on the metal side of a laminated backing that comprised a one-mil-thick polyethylene terephthalate film adhered to a one-ounce-per-square-foot annealed copper foil; the film and foil were adhered together with an adhesive having the above formulation except without nickel powder. The coating of adhesive was dried 2-½ minutes at 125° F and 2-½ minutes at 220° F, after which the tape was wound into a roll with a silicone-treated paper liner wrapped between the windings. The final tape was 4.2 mils thick, with the copper foil being 1.4 mils thick, the adhesive adhering the foil and film 0.4 mil thick, the polyethylene terephthalate film 1 mil thick, and the particle-loaded adhesive 1.1 mils thick. Based on a density of 0.94 for the adhesive solids and an average apparent density for the particles of 0.55, the ratio of the apparent volume of metal particles to the volume of adhesive was about 3.12 to 1.

The tape was tested for conductivity by applying it over a set of 1/32-inch-wide line-shaped conductors arranged side-by-side on the surface of a circuit board on 1/16-inch centers, with the tape covering about a ½-inch length of all the conductors; thus, the total contact area of each conductor with the tape was 0.016 square inch. The tape was applied by laying the tape over the board, heating it for about 10 seconds with a hot-air gun at about 300° F, and then rolling the tape three times with heavy pressure with a hard rubber roller. Resistance to individual conductors ranged from 0.02 ohm to 0.08 ohm and averaged 0.06 ohm.

After application of the tape to the circuit board, the portions of the conductors not covered by the tape were nickel-plated and then gold-plated using the tape to connect the conductors into the plating circuit; contact between the metal foil and the current source was easily obtained through the polyethylene terephthalate film, and the whole assembly of circuit board and tape was immersed in the plating bath and acted as the cathode. The tape was then removed, leaving a uniform sharp plating line where the tape had covered the fingers. Gold was deposited on the sides of the tape but not on the back covered with the polyethylene terephthalate film. Measurements of the thickness of the gold coating showed that it was quite uniform from finger to finger.

EXAMPLE 2

A particle-loaded conductive rubber-resin adhesive was prepared by mixing the following ingredients in a high-speed mixer and then running the mixture through a paint mill twice:

| | Parts by Weight |
|---|---|
| 60-weight-percent solids solution in xylol of a silicone adhesive believed to comprise 50 percent silicone rubber and 50 percent silicone resin as described in U.S. Pat. No. 2,882,183 | 400 |
| Carbonyl nickel powder as described in Example 1 | 252 |
| Toluene | 50 |

This particle-loaded adhesive was knife-coated on the metal side of the laminated backing described in Example 1 using an orifice of 3 mils and drying the coated material 2-½ minutes each at 150° and 250° F. The dry layer of adhesive was 0.7 mil thick and weighed 9.3 grains per 24 square inches. The ratio of apparent volume of particles to volume of adhesive was 1.98 to 1.

The tape was applied using a heat gun and a rubber roller as described in Example 1 over parts of 5/64-inch-wide copper conductors of a G-60 circuit board which had been plated with solder. The solder was then removed from the uncovered portions of the conductors using a MacDermid two-part solder stripper. First the circuit board was immersed at room temperature in Metex Stripper for 7 minutes, during which the solder first became dark gray and then light gray, meaning that it was ready to be removed. Next the circuit board was immersed at room temperature in Metex M 673 for about 15 seconds until the conductors became copper colored. The circuit board was then washed and dried after which the tape was removed. There were straight sharp lines separating portions of the conductors from which solder had been removed from portions still covered with solder, with no indication of penetration of the stripping liquids under the edges of the tape during the process. If the tape had been left in place, the exposed portions of the copper fingers could have been plated with gold as described in Example 1.

The tape of the example was also adhered, in the manner described above, over a ½-inch length of side-by-side 1/32-inch-wide copper conductors of a circuit board. Resistance through the tape to each of the conductors was found to average 0.25 ohm and to range from 0.15 to 0.35 ohm.

EXAMPLE 3

The following ingredients were mixed in a high-speed mixer:

| | Parts by Weight |
|---|---|
| 22.8-weight-percent-solids solution in ethyl acetate of a copolymer of isooctyl acrylate (96 parts) and acrylamide (4 parts) | 420 |
| Carbonyl nickel as described in Example 1 | 27.3 |
| Copper Inhibitor 50 | 1.5 |
| Santonox R | 4.5 |
| Toluene | 90 |

The resulting particle-loaded adhesive was knife-coated on one-ounce dead-soft copper foil using a 6-mil orifice, and drying the coating 1 minute each at 150° and 220° F. The layer of adhesive was 0.6 mil thick and weighed 6.1 grains per 24 square inches. The ratio of apparent volume of particles to volume of adhesive was 0.46 to 1.

The tape was applied as described in Example 1 to a circuit board containing 1/32-inch-wide copper fingers, and resistance to the conductors was found to average 0.23 ohm, with a range of 0.05 to 0.35 ohm. Pressure-sensitive adhesion of the tape by ASTM D-1000 was 17 ounces per inch width. When the tape was applied using a hot-air gun and a rubber roller as described in Example 1, adhesion measured by ASTM D-1000 was 28 ounces per inch width.

EXAMPLE 4

The following ingredients were mixed in a high-speed mixer and then run through a paint mill twice:

| | Parts by Weight |
|---|---|
| 32-weight-percent-solids solution in heptane of a partially vulcanized pressure-sensitive adhesive material including 100 parts natural rubber, 3 parts zinc oxide, 20 parts heat-treated wood rosin having a ball-and-ring melting point of 70°-74°C (Tenex from Newport Industries) 60 parts terpene polymer softening at 115°C (Croturez B-115; from Crosby Chemicals) and 20 parts of an oil-soluble heat-reactive phenol-formaldehyde resin based primarily on tertiary butyl phenol (CKR 1634 from Union Carbide) | 480 |
| Carbonyl nickel powder having an average particle size of about 3.3 microns and an apparent density of 0.8–1.0 gram/cc (Type 287 from International Nickel Co.) | 167 |
| Copper Inhibitor | 7.5 |
| Toluene | 150 |

The particle-loaded adhesive was knife-coated on a laminated backing as described in Example 1 using an orifice of 5 mils and drying the coating for 2-½ minutes each at 110° and 220° F. The dry layer of adhesive was 1-mil thick and weighed 10.8 grains per 24 square inches.

The tape was then applied in the manner described in Example 1 to a circuit board having 1/32-inch-wide conductors or fingers, and resistance through the tape to each conductor was measured and found to average 0.55 ohm and range from 0.4 to 0.7 ohm. The ratio of apparent volume of metal particles to volume of adhesive was 1.11 to 1.

EXAMPLE 5

The following ingredients were mixed in a high-speed mixer for 2 minutes:

| | Parts by Weight |
|---|---|
| 22.8-weight-percent-solids solution of a 96/4 copolymer of isoctyl acrylate and acrylamide | 63 |
| Copper Inhibitor 50 | 0.5 |
| Santonox R | 1.5 |
| Carbonyl nickel powder of Example 1 | 35.9 |

Seventy-seven parts by weight of the solution of copolymer and 30 parts of toluene were added and mixing continued for 1 minute more. A hand spread of this adhesive on one-ounce dead-soft copper foil was made using a 6-mil orifice and drying 1 minute each at 150° and 220° F. The layer of adhesive was 0.75 mil thick and the ratio of the apparent volume of particles to the volume of adhesive was 3.73 to 1.

Resistance through the tape to a ½-inch length of 1/32-inch-wide conductors on a circuit board measured as in Example 1 averaged 0.1 ohm, with a range of 0.05 to 0.20 ohm. The tape was also applied in the manner described in Example 1 to a circuit board having 222 exposed circular copper electrodes 10 mils in diameter. Resistance through the tape to each of the electrodes was measured, with 219 having a resistance of 1 ohm or less, 2 having a resistance just above 1 ohm, and 1 having a resistance of 8 ohms.

EXAMPLE 6

To illustrate the difference in electrical conductivity between tapes using nickel particles having an apparent density of 1.2 grams/cc and tapes using nickel particles having an apparent density of 0.55 gram/cc, two different tapes were prepared, Tape A using a particle-loaded adhesive having the formulation described in Example 1 and Tape B using a particle-loaded adhesive prepared by mixing the following ingredients in a high-speed mixer:

| | Parts by Weight |
|---|---|
| 25-weight-percent-solids solution of copolymer of isoctyl acrylate (96 parts) and acrylamide (4 parts) in ethyl acetate | 140 |
| Copper Inhibitor 55 | 0.5 |
| Santonox R | 1.5 |
| Toluene | 30 |
| Nickel powder having an apparent density of 1.2 grams/cc (NF-3M from Sherritt Gordon MInes) | 67.4 |

Both kinds of particle-loaded adhesive were coated on one-ounce dead-soft copper foil using an orifice of 5 mils, after which the coating was dried 1 minute each at 150° and 250° F. The tapes were both tested for resistance as described in Example 1 by applying them with heat and pressure to a circuit board having exposed side-by-side 1/32-inch-wide copper fingers on 1/16-inch centers. The resistance to each finger through Tape A averaged 0.1 ohm with a range of 0.05 to 0.15 ohm and the resistance to each finger through Tape B averaged 0.6 ohm with a range of 0.4 to 1 ohm.

As the examples illustrate, the lower the apparent density of the particles, which occurs with particles that are smaller and have a more complex shape, the better is the electrical conductivity in a particle-loaded adhesive. The preferred particles may be visualized as chain-like structures of irregularly shaped particles of small cross-section, giving a porous clinker-like appearance. It is theorized that the lower the apparent density of the particles, the more numerous and extensive are the "legs" of the particle through the volume occupied by the particle; and as a result the more extensive are the conductive paths through the adhesive. Electrical conductivity is thus improved and the adhesive can contact smaller contact fingers or electrodes, giving it greater usefulness in the plating of circuit board components as well as improved utility for other purposes. The preferred tapes of this invention use a particle-loaded adhesive in which the particles have an apparent density of less than about 7 percent of their true density. Less preferred tapes use a particle-loaded adhesive having an apparent density of about 10 percent of their true density, such as illustrated by the nickel powder of Example 4.

For best results, the particles are included in the adhesive material in an amount such that the ratio of the apparent volume of the particles to the volume of the adhesive material is more than 2 to 1 and preferably about 3 to 1 or more. On the other hand, useful tapes can be made using particle-loaded adhesives in which the ratio of the apparent volume of the metal particles to the volume of the adhesive material is as low as about 0.5 to 1. So that good adhesion will be obtained, the true volume of the particles is preferably less than 50 percent of the volume of the adhesive, and for the preferred particles is more preferably less than 25 percent of the volume of adhesive.

Nickel particles are much preferred because of their good conductivity and resistance to corrosion. But other particles are useful, including cobalt, silver, and gold for special applications where the expense of the tape is not a factor, and copper and aluminum. The particles should be uniformly dispersed in the adhesive material in a way that will not compact the particles. Mixing in a high-speed rotary mixer gives good results, but additional mixing as in a three-roll paint mill gives even better results. Pebble milling using small ceramic pebbles may also be used. To provide mixtures of adhesive material and electrically conductive particles that will be chemically compatible so as to have a useful life, antioxidants and chelating-type inhibitors, such as 4,4-thiobis(6-tertbutyl-metacresol) and disalicylal propylene diamine, may be incorporated into the adhesive material as taught in Stow, U.S. Pat. No. 3,475,213.

The adhesive material is chosen depending on the method of applying the tape, the environment to which the tape will be exposed, the surface to which the tape is to be applied, etc. The adhesive material should flow and develop good contact with the substrate during application of the tape, even when filled with particles. Pressure-sensitive adhesives, which may be described as materials that when applied as a layer on a backing will adhere the backing to a variety of dissimilar surfaces with mere finger or hand pressure and yet permit the tape to be handled with the fingers and removed from a smooth surface without leaving a residue, are particularly suitable, though the ultimate particle-loaded adhesive will generally not be a pressure-sensitive adhesive at room temperature. Typical useful pressure-sensitive adhesive materials are acrylate polymers such as taught in U.S. Pat. No. Re24,906, rubber-resin adhesives comprising a mixture of an elastomeric polymer and tackifying resin, and silicone rubber-based pressure-sensitive adhesives.

The layer of adhesive is thin enough to permit good conduction through it, but is thick enough to provide good adhesion. The layer of adhesive will almost always be less than 5 mils thick, and it preferably is less than about 1.5 mils, and more preferably less than about 1 mils, thick. It is generally at least about 0.5 mil thick. When high loadings of particles are used, the thickness will generally be greater in order to assure good adhesion.

The backing for a tape of the invention will generally be a metal foil, with such metals as copper and aluminum being most often used. For preferred results, the foil will be about one mil or more thick. When the tape is to be used for electroplating of circuit boards, it will generally have a non-conductive organic polymeric film or coating on the side opposite from the adhesive in order to prevent plating on the back side of the tape. A polyethylene terephthalate film laminated to the back side of the foil is particularly useful.

What is claimed is:

1. An electrically conductive adhesive tape capable of reliably contacting small-diameter electrodes comprising a metal foil backing and a layer of an electrically conductive adhesive united in electrically conductive relation to at least one side of the backing, said adhesive comprising a chemically compatible mixture of adhesive material and small metal particles of complex shape having an apparent density less than about 10 percent of their true density dispersed in the adhesive material in an amount providing a ratio of apparent volume of metal particles to volume of adhesive material of at least about 0.5 to 1.

2. A tape of claim 1 in which the particles have an apparent density of less than about 7 percent of their true density.

3. A tape of claim 1 in which the ratio of apparent volume of particles to volume of adhesive material is at least 2 to 1.

4. A tape of claim 1 in which an electrically insulative organic polymeric film is carried on the side of the foil opposite from the adhesive layer.

5. A tape of claim 1 in which the particles comprise nickel particles.

6. A tape of claim 1 in which the particles comprise carbonyl nickel particles having an apparent density less than about 0.6 gram/cubic centimeter.

7. A tape of claim 1 in which the adhesive material comprises a pressure-sensitive adhesive material.

8. An electrically conductive adhesive tape capable of reliably contacting small electrodes comprising a metal foil backing, an electrically insulative organic polymeric film united to one side of the backing, and a layer between about 0.5 and 1.5 mils thick of an electrically conductive adhesive united in electrically conductive relation to the other side of the backing, said adhesive comprising a chemically compatible mixture of pressure-sensitive adhesive material and nickel particles having an apparent density of less than about 0.6 gram/cubic centimeter dispersed in the adhesive material in an amount providing a ratio of apparent volume of metal particles to volume of adhesive material of at least about 2 to 1.

* * * * *